Sept. 24, 1963 G. MISSRIEGLER ETAL 3,104,843

DEVICE ON OR IN A RECORDING AND/OR REPRODUCING APPARATUS, PREFERABLY A MAGNETIC REPRODUCER, WITH MAGAZINES

Filed June 5, 1961 2 Sheets-Sheet 1

INVENTOR
GERHARD MISSRIEGLER
FRIEDRICH LAA
BY
Frank R. Jeifari
AGENT

DEVICE ON OR IN A RECORDING AND/OR REPRODUCING APPARATUS, PREFERABLY A MAGNETIC REPRODUCER, WITH MAGAZINES

Filed June 5, 1961

2 Sheets-Sheet 2

INVENTOR
GERHARD MISSRIEGLER
FRIEDRICH LAA
BY
Frank R. Jirifasi
AGENT

United States Patent Office 3,104,843

Patented Sept. 24, 1963

3,104,843

DEVICE ON OR IN A RECORDING AND/OR REPRODUCING APPARATUS, PREFERABLY A MAGNETIC REPRODUCER, WITH MAGAZINES

Gerhard Missriegler and Friedrich Laa, Vienna, Austria, assignors to North American Philips Company Inc., New York, N.Y., a corporation of Delaware Filed June 5, 1961, Ser. No. 114,893
Claims priority, application Austria June 11, 1960
6 Claims. (Cl. 242—55.13)

The invention relates to a device on or in a recording and/or reproducing apparatus, preferably a magnetic reproducer, with magazines, which are constructed for receiving one single spool of the record carrier.

Magazines which comprise one single spool of the record carrier have the great advantage, as compared with magazines in which the coiling of the record carrier leaving the supply spool also occurs inside the magazine, that they occupy little space and can be manufactured with little material. On the other hand, it is a particular advantage of the magazines which comprise two spools that each manipulation with the record carrier itself is avoided since its two ends are fixedly secured to the spool carriers, for example cores of reels. The comparatively large dimensions of such magazines are a disadvantage. On the other hand, magazines which comprise one single spool of the record carrier have the drawback that manipulations have always to be carried out with the record carrier itself, since at least the beginning of the carrier supply present in the magazine has to be connected to a device with which the carrier can be wound off from the supply and be stored again elsewhere, for example in the form of a spool in a second magazine. In addition, also the end of the supply spool, if it is not attached to the reel core and consequently can leave the magazine at the end of the supply, has not only to be inserted again into the magazine but should also be secured to the reel core again. If the end of the supply spool is fixed in the magazine, the magazine can be used again only after coiling back the whole supply into the magazine.

Therefore, for magazines destined for receiving one spool only, it has already been proposed in application Serial No. 125,603 filed May 12, 1961 in the name of Friedrich Laa, a joint inventor of this invention, and to which this application is related, to construct the magazine and the ends of the record carriers so that for forming a spool in an empty magazine only the beginning of the sound carrier to be wound up has to be introduced into an aperture provided in the wall of the magazine. The attachment to the reel core is effected automatically as soon as it is rotated by the driving gear of the apparatus. In this manner a magazine is obtained with one spool only which has all the advantages of this type of magazines and is easy of manipulation all the same. Only one manipulation with the record carrier itself is still necessary. The greatest ease in operation and use and complete reliability against faulty operation are achieved only when a device is provided with which the transmission of the end of the carrier leaving the supply spool passes into a winding magazine entirely automatically, so manipulation with the magazine only consists in that the magazine has to be inserted into the apparatus.

According to the invention an improved device is provided which is characterized in that for the transmission of the end of the carrier leaving the supply magazine into the aperture for passing into the winding magazine, a driver is provided on a slide which is swingable and shiftable on a guide against a readjusting force, for example a spring or the like, with which driver the end of the sound carrier to be transmitted can be seized by swinging the slide (and driver respectively) and can be taken along by shifting the latter and that in addition a driving device is provided which can be coupled to the driving gear of the apparatus, possibly the motor or a rotating mass, for swinging and shifting the slide (and driver respectively). According to particularly effective and advantageous embodiments of the invention, the driving device for the slide comprises a shaft which may be coupled to the driving gear of the apparatus, for example by a friction wheel, on which shaft a rope may be wound which is attached to the slide, the point of action of the traction of the rope being chosen so that a component required for swinging the slide (and driver respectively) is present. Switching elements are provided on the slide or the driving device, by which the coupling between the driving device and driving gear of the apparatus may be removed automatically as soon as the end of the carrier to be transmitted is introduced into the aperture for passing into the winding magazine. For effecting the coupling between the driving device of the slide and the driving gear of the apparatus two transmission members, for example a lever or the like, are provided which can be brought out of their rest position by inserting the magazine on the apparatus against a readjusting force, for example a spring or the like, the coupling being effected by operating the members. Finally, one of the two transmission members is connected to the switching members for removing the coupling, by which on return of the transmission member into its rest position the switching members, when removing the magazine, are readjusted to the position from which the decoupling operation can be introduced. In a particularly simple manner, the coupling device can be switched in by an electromagnet, in the current circuit of which are provided two pairs of contacts connected in series and closing when inserting the magazines, and a pair of contacts as switching members for removing the coupling, and, as the case may be, an additional pair of contacts which is opened on operation of the switching device for switching on the motion of the carrier. As a switching member for removing the coupling a rocker switch is preferably provided which, in the case of the magazines removed, is closed by the transmission members for effecting the coupling and the opening of which is effected by a lever which is swingable by a driver provided on the rope which can be wound onto the shaft.

In order that the invention may readily be carried into effect, it will now be described, by way of example, with reference to the accompanying drawings, in which.

Figure 1:
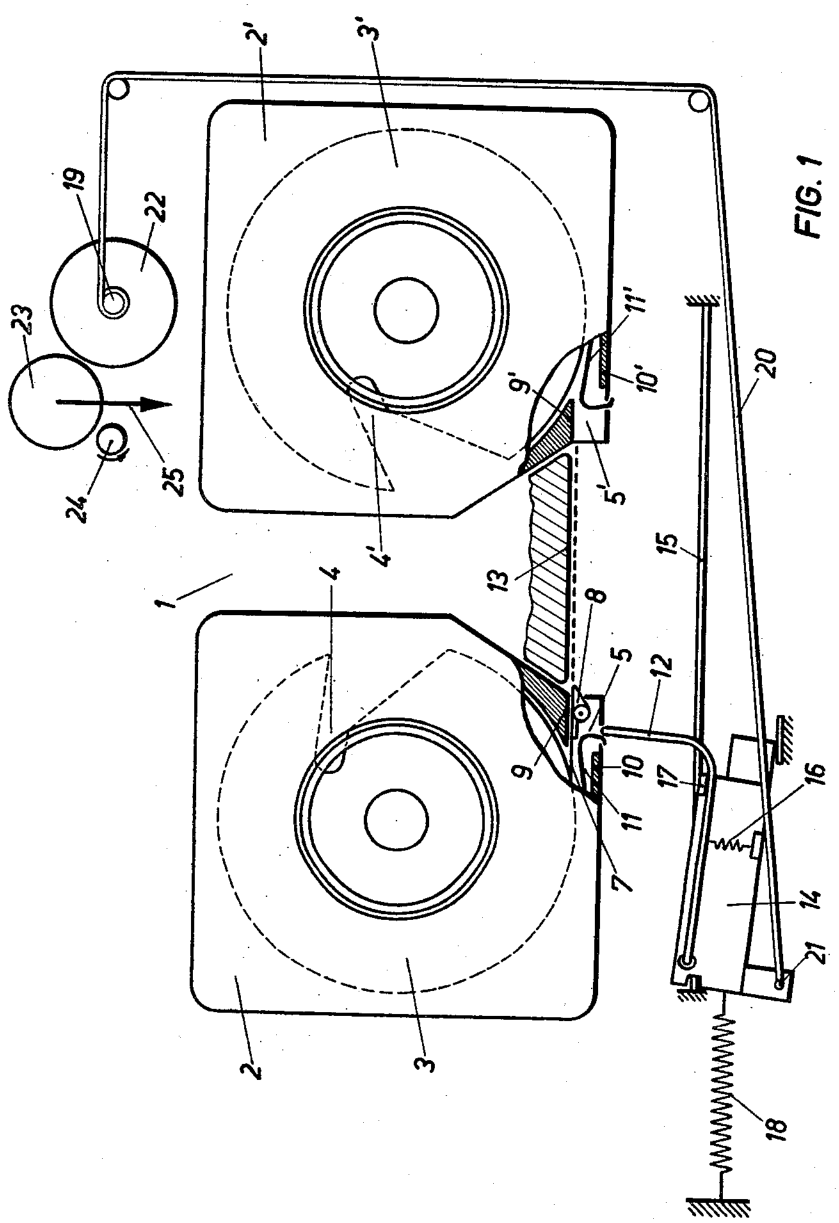
FIGURE 1 is a diagrammatic view which shows a device according to the invention.

In the device shown in FIGURE 1, two magazines indicated by the reference numerals 2 and 2′ lie on the cover plate 1 of a recording and/or reproducing apparatus. Each magazine comprises a reel 3, 3′ provided with a slot 4, 4′ extending slant-wise in the flanges and into the reel core. By inserting the housings of the magazines on the cover plate 1 of the apparatus, the reels 3, 3′ are positioned in a manner known per se (not shown) on their relative turntable, by means of which the reels can be rotated. Each magazine comprises an aperture 5, 5′ for passing the record carrier or tape 7. On each end of the tape, wedge-shaped members 8 are provided. The width of these members is larger than the internal distance between the reel flanges. In a magazine which contains the feed spool (in the drawing magazine 2), the wedge-shaped member 8 lies on a bearing surface 9, 9′ in the aperture 5. The side wall 10, 10′ of each magazine in the area of the aperture 5 is extended only so far that this aperture is also accessible from the sides. A spring 11, 11′ narrows the aperture 5 to such an extent that the wedge-shaped member 8 can be introduced with its knife-edge into the aperture 5 but cannot be drawn into the magazine by the tape with its thick end first. If the wedge-shaped member 8 is passed into the aperture 5′ of the magazine 2′ shown on the right-hand side in FIGURE 1, the spring 11′ forces it against the flanges of the spool 3′ or, if the slot 4′ is just behind the aperture 5′, into this aperture. If the spool 3′ is turned, the member 8 is taken along by the slot 4′.

For transmitting the end of the carrier with the wedge-shaped member 8 leaving the supply magazine 2 into the aperture of the winding magazine 2′, a driver 12 is brought behind the thick end of the wedge-shaped member 8 by swinging it in the proximity of the magazine 2, as a result of which this member is driven to the right when shifting the driver 12 and brought into the aperture 5′. In order that the wedge-shaped member 8 cannot deviate when shifting the driver 12 from left to right, it may be of advantage to provide a guideway 13 between the magazines in which also the head, and the driving shaft for the carrier 7 are provided. In how far the necessity exists for this is determined by the special construction of the driver 12 and members 8 provided on the ends of the carrier.

The driver 12 is supported on a slide 14 which is situated on the guide 15 in a shiftable and swingable manner. The driver 12 in turn can also be swung with respect to the slide, a spring 16 keeping it against a stop member 17. Naturally, also a construction in which only the driver 12 is swung is possible. It is possible in this manner, also on the case of the supply reel lying on the right-hand side, to hold the wedge-shaped member 8, since the driver 12 sliding to the right-hand side can slide onto the wedge and hold it then on its backside. The slide is kept in a final position on the left-hand side by the spring 18 or brought back to this condition each time in which the driver is swung back.

The motive device for the slide 14 comprises a shaft 19 on which a rope 20 is wound which engages the slide 14 at point 21. This point 21 is chosen so that a large force component is active on the slide resulting in swinging same. By pulling at the rope, the driver 12 is swung and shifted. In order to cause the shaft 19 to rotate, a driving wheel 22 is provided on it which can be coupled to the shaft 24 of the motor of the driving gear of the apparatus by means of a shiftable intermediate wheel 23. This coupling indicated by the arrow 25 may be effected, for example, by means of a switch which excites a draw magnet for shifting the intermediate wheel 23. However, the intermediate wheel may also be shifted mechanically by means of a key. The driving of the shaft 22 may be stopped by switching off the coupling 25, as soon as the member 8 is introduced into the aperture 5′ of the winding magazine 2′. Naturally, any other type of driving of the slide may be chosen, for example by means of a spur gear and a worm, or the like.

In order to stop the motion of the slide 14 automatically when the final condition is reached in which the transmission is performed, a key with pawl may be provided, for example, for operating the coupling 25, the pawl being switched off, for example, by the slide at the instance at which the driver 12 has performed the transmission of the end of the carrier.

An electrically controlled automatic switching off of the driving motion is shown in FIGURES 2 to 5. The motive device for the slide 14 again comprises a shaft 19 on which the rope 20 is wound. The driving wheel 22 of the shaft 19 can be coupled to the shaft 24 of the motor by a shiftable and pivoted intermediate wheel 23. An electromagnet 26 is provided for coupling which, via a mechanism (not shown), represented by arrow 27 brings the intermediate wheel 23 in contact with the wheel 22 and the shaft 24 when the electromagnet is excited. In the current circuit of this electromagnet (FIGURE 5), the two pairs of contacts 28 and 29, a rocker switch 30 and a further pair of contacts 31 are arranged in series. This pair of contacts 31 is connected to the switching device for switching on the motion of the carrier so that it is opened when switching on that motion. So long as the record carrier is moving, the slide 14 can never be moved.

Figures 2, 3, 4, 5:
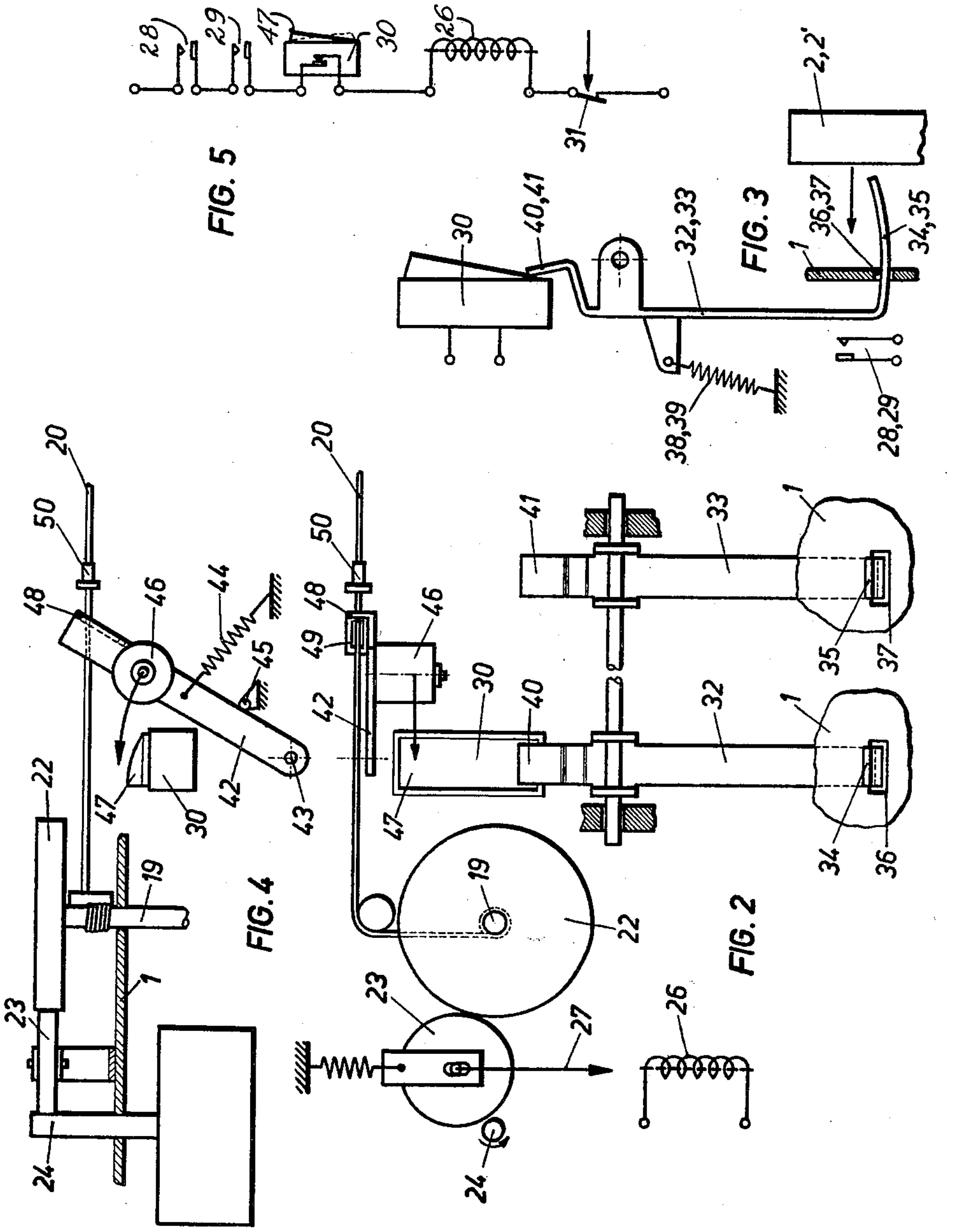
FIGURE 2 is a schematic view which shows an embodiment of a device according to the invention with electric control in plan view.
FIGURES 3 and 4 are schematic views which show parts of the circuit arrangement shown in FIGURE 2 in two different side views.
FIGURE 5 is a schematic view which shows the electric circuit diagram of the circuit arrangement shown in FIGURE 2.

FIG. 3 illustrates operation of the two contacts 28 and 29, for which the two levers 32 and 33 are provided. The rocker switch 30 is switched by one of these two levers, in the example by lever 32, but also by an additional lever 42 (FIG. 4). Each of the levers 32 and 33 has two arms. The one lever arm (34 and 35 respectively) is bent and extends through apertures 36 and 37 respectively of the cover plate 1 of the apparatus in the space which is occupied by the inserted magazines 2 and 2′ respectively. Springs 38 and 39 respectively keep the levers in a position in which the bent ends 35, 34 are pressed upwards. They are pressed downwards only when inserting the magazines 2 and 2′. Below these lever arms with the ends bent upwards, the contacts 28 and 29 are provided so that they are closed when pressing the lever arms 34 and 35 downwards. Below one of the other lever arms 40 and 41 respectively (in the embodiment shown below the lever arm 40), the rocker switch 30 is provided so that it is closed by pressing this arm 40 downwards. This pressing downwards is effected by the force of the spring 38 when the magazine engaging the lever is removed. In the case of the magazine being removed, the rocker switch 30 is consequently closed. As a result of this, the situation arises for the current circuit (FIGURE 5) of the draw magnet 26 that, in the case of resting record carrier and magazine removed, it is prepared for the flow of current but that the flow of current can start only when the two magazines are inserted. However, at this instant also the flow of current begins and the motion of the slide 14 and consequently the transmission of the end of the carrier leaving the supply magazine into the aperture of the winding magazine.

In order to stop the motion, (FIG. 4) the electromagnet 26 must be switched off. This is effected by the lever 42. It is swingable around the shaft 43 which is provided at right angles to the draw rope 20. Its rest position is determined by the spring 44 and the stop member 45. It has a roller 46 which, on swinging, runs up the end of the key of the rocker switch 30. This end is upwards when the switching contact is closed (end 47), and consequently the roller 46 forces said end 47 downwards and opens the switch as a result of which the current circuit of the electromagnet 26 is interrupted. In order that the lever 42 can be swung, it has a projection 48 with a slot 49 through which the draw rope 20 is conducted. For taking along the lever 42, the catch 50 is provided on the draw rope, for example a hook clamped to it. It is not difficult to attach this hook accurately so that the interruption of the current is effected at the right instant. The condition for transmitting the end of the sound carrier is given in this manner in the case of the magazines removed.

Naturally, other constructions are possible without departing from the scope of the invention.

What is claimed is:

1. The combination with a magnetic tape recorder and reproducer of the magazine type having discrete supply and take up magazines, of apparatus for automatically transferring the tape from the supply magazine to the take-up magazine, said apparatus comprising:

means mounted on said tape recorder for movement between said supply and take-up magazines, means for moving said first named means, means supported on said first named means for engaging the tape projecting from said supply magazine, means for moving said last named means into engagement with said tape, and means responsive to proper positioning of each said magazine for actuating said means for moving said first named means, and terminating movement of said first named means upon transfer of said tape from the supply to the take-up magazine.

2. The combination with a magnetic tape recorder and reproducer of the magazine type having discrete supply and take-up magazines, of apparatus for automatically transferring the tape from a supply magazine to the take-up magazine, said apparatus comprising;

a guide means on said tape recorder adjacent said magazines and extending therebetween, a slide means pivotally and movably mounted on said guide, means supported on said slide means for engaging the tape projecting from said supply magazine upon pivotal movement of said slide and driving said tape from the supply magazine to the take-up magazine, and means for moving said slide including a coupling means operative in response to proper placement of said magazines on said recorder for connecting said last named means with a driven shaft of said tape recorder, and means for disconnecting said last named means from said driven shaft.

3. The combination according to claim 2 wherein said means for moving said slide comprises said driving wheel, a pulley wheel having one end of a rope attached thereto, the other end of said rope being attached to said slide, and a friction wheel movably mounted for connecting said driven wheel with said pulley, said coupling means being operatively associated with said friction wheel for moving the same into engagement with both said driven and pulley wheels.

4. The combination according to claim 3 wherein said coupling means comprises an electromagnet operatively associated with said friction wheel, electric circuit means for said electromagnet having at least two switches in series in said circuit, each said switch being connected with a lever arm for opening and closing said switch, each said lever arm being operatively associated with one of said magazines whereby said switches are closed upon proper positioning of said magazines on said tape recorder.

5. The combination according to claim 4 wherein said means for disconnecting said last named means comprises a rocker switch in said circuit in series with said two switches, said rocker switch being normally closed, a pivotal lever arm adjacent said rope, an adjustable catch on said rope adapted to rotate said pivotal lever arm upon movement of said rope, and said pivotal lever arm contacting said rocker switch for opening said circuit when said slide reaches a determined position.

6. The combination according to claim 4 with the addition of a manually operated switch in series in said electric circuit which is in opened position during normal operation of said tape recorder.

References Cited in the file of this patent

UNITED STATES PATENTS

| | | |
|---|---|---|
| 2,778,880 | Eash | Jan. 22, 1957 |
| 2,894,700 | Roberts et al. | July 14, 1959 |